United States Patent [19]

Moeller, Jr.

[11] 4,110,054

[45] Aug. 29, 1978

[54] CLAMPABLE PLASTIC GEAR AND THE LIKE

[75] Inventor: Carl A. Moeller, Jr., Duxbury, Mass.

[73] Assignee: Flexothane Corporation, Randolph, Mass.

[21] Appl. No.: 729,115

[22] Filed: Oct. 4, 1976

[51] Int. Cl.² ............................................. F16B 2/08
[52] U.S. Cl. .............................. 403/373; 74/DIG. 10
[58] Field of Search ............... 403/373, 290, 374, 383;
24/274 R, 274 P, 274 WB; 74/DIG. 10;
285/253

[56] References Cited

U.S. PATENT DOCUMENTS

| 2,391,302 | 12/1945 | Evans | 403/374 X |
|---|---|---|---|
| 2,704,675 | 3/1955 | Henderson | 285/253 X |
| 3,021,049 | 2/1962 | Settle | 403/374 X |
| 3,210,104 | 10/1965 | Davis et al. | 403/245 |
| 3,354,672 | 11/1967 | Klaeui | 403/354 X |
| 3,457,234 | 7/1969 | Gianatasio | 74/DIG. 10 |
| 3,572,774 | 3/1971 | Sipler | 285/253 |

FOREIGN PATENT DOCUMENTS 783,802  10/1957  United Kingdom .................... 403/383

Primary Examiner—Andrew V. Kundrat
Attorney, Agent, or Firm—Morse, Altman, Oates & Bello

[57] ABSTRACT

A gear, end plate, or the like, is formed from a hard, tough plastic such as polyurethane and is locked onto a supporting shaft by means of a clamp engaging an integral annular hub formed on one side of the gear. The clamp is in the form of a metal band, the ends of which are provided with a nut and screw by means of which the band may be tightened to apply clamping pressure.

1 Claim, 6 Drawing Figures 4,110,054

CLAMPABLE PLASTIC GEAR AND THE LIKE

BACKGROUND OF THE INVENTION

1. Field of the Invention

This invention relates generally to clampable gears, end plates for cylinders, and the like, and more particularly is directed towards a new and improved annular plastic gear, end plate, or the like, which is readily clamped onto a shaft at any precise angular position with respect to the shaft.

2. Description of the Prior Art

In a great many machines annular parts such as gears, pulleys, cylinders, rollers, and the like, must be mounted temporarily onto a supporting shaft. In many such machines the precise angular position of the annular part with respect to the shaft is critical to ensure proper operation of the machine such as meshing of parts, for example.

Also, many machines require rather frequent changing of some of their parts. For example, in printing machines a new cylindrical printing plate must be installed each time a printing change is made. This involves removing the cylinder and setting up a new one, then precisely positioning the cylinder on the shaft to ensure proper registration of the print image. Typically, the cylinder is connected to the shaft by means of a set screw extending radially through the hub of the end cap and bearing against the shaft. This technique, while commonly used, is not entirely satisfactory since the set screw tends to dent the shaft slightly and thereby inhibit minor angular adjustments. Other techniques that have been used include keys and keyways, shrink fitting, or slotting the hub of the gear or end cap and using various types of clamps. Slotted hubs require extra machinery operations on the part, while heat shrinking require mounting and demounting devices using electric heat. Similarly, the use of keys necessitates cutting keyways in the shaft and hub while the use of set screws requires drilling and tapping, all of which are expensive, time consuming operations. Thus, none of the measures taken heretofore have been entirely satisfactory from the standpoint of cost, weight, and ease of assembly.

Accordingly, it is an object of the present invention to provide improvements in gears, pulleys, end caps, and the like. Another object of this invention is to provide improved clamping arrangement for gears and the like whereby the gear may be adjusted easily and precisely with respect to the supporting shaft.

Another object of this invention is to provide a low-cost, lightweight plastic gear, pulley, end plate, or the like, that is easily clamped to a shaft and precisely positioned thereon.

SUMMARY OF THE INVENTION

This invention features an annular member such as a gear, pulley, end cap, or the like, clampable to a shaft end comprising an annular body portion, the outer periphery of which is formed according to the desired functions, such as gear teeth, or the like. A concentric hub portion is formed integral with the body portion and to one side thereof. The annular member is formed of a plastic material such as polyurethane and is dimensioned to fit over a shaft. A metal clamping band is fitted over the hub with a screw and nut connection joining the band ends by means of which the hub is clamped tightly onto the shaft.

DETAILED DESCRIPTION OF THE PREFERRED EMBODIMENTS

Figure 1:
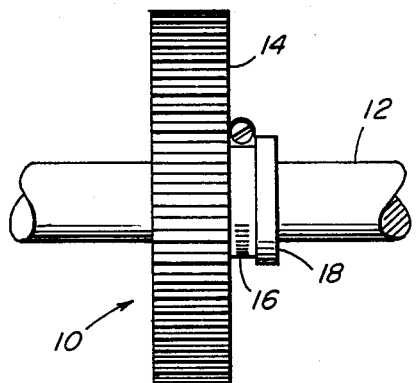
FIG. 1 is a view in side elevation of a clampable gear made according to the invention.
Figure 2:
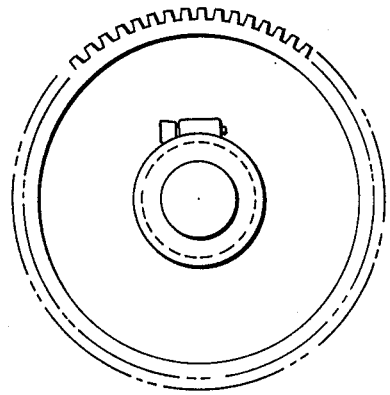
FIG. 2 is a view in front elevation thereof.
Figure 5:
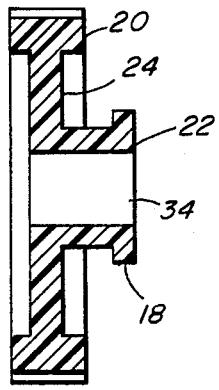
FIG. 5 is a sectional view in side elevation of the gear, and, FIG. 6 is a sectional view in side elevation showing a modification of the invention.
Figure 3:
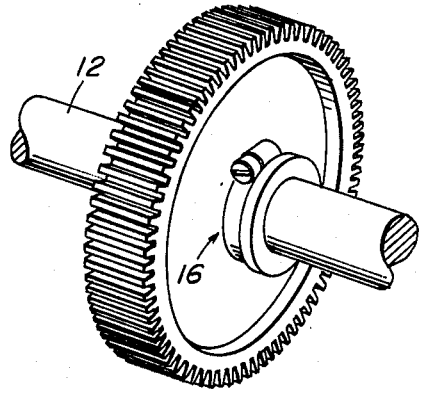
FIG. 3 is a perspective view thereof.
Figure 4:
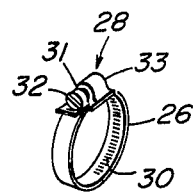
FIG. 4 is a perspective view of the clamp portion of the assembly.

Referring now to the drawings, the reference character 10 generally indicates a clampable gear assembly mounted to a cylindrical shaft 12. The gear and shaft may be part of a wide variety of machines which use gears and the gear is particularly useful for machines in which gears must be replaced on a frequent basis and installed at a precise angular position with respect to its supporting shaft. In the preferred form of the invention, the gear assembly 10 is comprised of an annular gear body 14 and an adjustable clamp 16 mounted over a hub 18 on one side of the gear.

The gear includes annular teeth 20 about the outer periphery or rim of the gear body and a coaxial collar 22 at the outer end of the hub which connects to the gear rim by means of an annular web portion 24. The hub 22 includes the annular collar 18 which serves as a shoulder stop at the end of the hub for the clamp 16. The hub and collar extend sufficiently to the side of the gear rim 20 so that the clamp 16 will be easily accessible as by a screw driver or other appropriate tool.

According to the invention, the entire gear body 14 is fabricated in one piece of plastic and preferably the plastic is polyurethane, which may be readily formed into the gear shape by casting techniques, or the like. In practice, the gear is fully formed in one casting operation without any additional machining or the like. Taking into consideration the shrink factor of the polyurethane, a part with very close tolerances may be produced both with respect to the inside and outside diameter. The polyurethane is a hard, tough plastic which may be cured to the order of 75° Shore "A" durometer hardness, which is preferred for machinery applications such as the gear 14 of the illustrated embodiment. the polyurethane is also characterized by a slight degree of resilience by means of which the hub 22 may be distorted sufficiently under pressure applied by the clamp 16 so as to grip tightly against the shaft 12. Because of the resilience of the polyurethane, dimensions, particularly with respect to the gear teeth, are not critical. Since the polyurethane is somewhat compressible, the gear teeth may be slightly out-sized without causing damage to itself or to other gears.

According to the invention, the clamp 16 employed to grip the hub against the shaft 12 comprises a band 26, the ends of which connect to a tangential screw assembly 28 fixed to the ends of the band 26. The band itself is of flexible metal, such as steel, and is formed with a plurality of evenly spaced transverse slots 30. One end of the band is attached to a nut 31, while the other end is attached to a follower 33, with both the nut and follower engaging a screw 32. By use of a screw driver, the screw 32 may be turned in one direction or the other to loosen or tighten the band as required. The band applies even pressure about the hub so that the gear may be mounted tightly to the shaft.

In practice, the gear is formed with an axial passage 34 concentric with the hub and the rim and is of an inside dimension slightly greater (0.0005 inch, for example) than the outside dimension of the shaft 12 so that the gear may be slipped easily onto the shaft and rotated to the desired precise angular position required for the gear. Once the angle has been selected, the screw 32 on the clamp is turned in a direction to tighten the band and apply even radial pressure on the hub, thereby clamping the gear tightly to the shaft over a full 360° clamping surface. The clamping is done without denting or otherwise disfiguring the surface of the shaft so that should it become necessary to change the angular position of the gear, or to change an entire gear, this may be done without difficulty since there are no marks on the shaft which would interfere with the positioning of the gear. The gear may be easily removed by merely backing off on the screw 32 to relieve clamping pressure.

Figure 6:
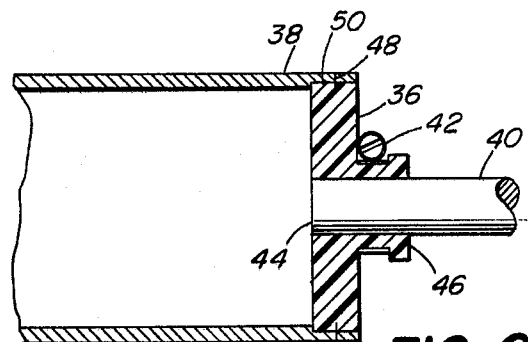

Referring now to FIG. 6 of the drawing, there is illustrated a modification of the invention and in this embodiment a polyurethane end cap 36 is provided for the end of a cylinder 38, the end cap 36 being held in position on a shaft 40 by means of a screw clamp 42 similar to the clamp 16 of the principal embodiment. The cylinder 38 may be, for example, a flexo-plate cylinder, such as using in printing machines, and which requires replacement for each change in printing runs. Since the cylinder 38 must be precisely positioned on the shaft 40 to insure proper registration of the print image, the clamp arrangement is idealy suited for this purpose. Further, the end cap 36 is relatively light in weight, easy to assemble and may be fabricated quickly and inexpensively. The end cap 36 of the illustrated embodiment includes a simple annular body portion having a central axial passage 44 through which the shaft 40 extends. The end cap also includes a hub 46 similar to the hub 22 of the principal embodiment and serves to seat the clamp 16. The cylinder 38 may be fitted to the periphery of the end cap 36 by means of pins 48 or other fasteners and, in practice, the ends of the cylinders are formed with an annular stop shoulder 50 which controls the axial position of the cap with respect to the cylinder, as shown in FIG. 6.

Insofar as the gear, end cap, etc., is made of a plastic material, it will not rust onto its shaft and with no metal-to-metal contact it will not wear or gall the shaft if it is allowed to slip on the shaft. The plastic material is substantially lighter in weight than conventional metal gears of the same size and are, therefore, easier to handle, ship and install as well as less likely to cause injury if dropped.

While the invention has been described with particular reference to the illustrated embodiments, numerous modifications thereto will appear to those skilled in the art.

Having thus described the invention, what I claim and desire to obtain by Letters Patent of the United States is:

1. An annular part such as a gear for clamping engagement with a cylindrical shaft, comprising in combination
   (a) an annular body portion formed of a hard and slightly resilient polyurethane plastic material having a durometer hardness of approximately 75° on the Shore "A" scale, and
   (b) a flexible metal band,
   (c) said body portion being formed with an integral cylindrical hub portion extending coaxially to one side thereof and terminating in an outer annular collar providing a shoulder, said hub being formed with an opening therethrough coaxial with an opening in said gear and defining a smooth, continuous, inner cylindrical wall from end to end of said gear and hub openings,
   (d) said band mountable about said hub inwardly of said shoulder,
   (e) screw and nut means connecting the ends of said band in tangential relation to said hub portion for tensioning said band and applying clamping pressure thereto uniformly about said hub,
   (f) the periphery of said body portion being formed with an integral annular wide rim formed with integral gear teeth and an integral thin annular web defining said body portion and connecting said rim to said hub portion, said hub and collar extending axially beyond an end of said rim a distance sufficient to allow access to said screw by a tool oriented parallel to said web portion.

* * * * *